United States Patent
Sabo (10) Patent No.: US 11,204,683 B1
(45) Date of Patent: Dec. 21, 2021

(54) SYSTEMS AND METHODS FOR GENERATING AND TRACKING HARDCODED COMMUNICATIONS IN A COLLABORATION MANAGEMENT PLATFORM

(71) Applicant: Asana, Inc., San Francisco, CA (US)

(72) Inventor: Gregory Louis Sabo, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

(21) Appl. No.: 16/243,489

(22) Filed: Jan. 9, 2019

(51) Int. Cl.
- *G06F 3/048* (2013.01)
- *G06F 3/0482* (2013.01)
- *H04L 12/58* (2006.01)
- *H04L 29/06* (2006.01)

(52) U.S. Cl.
CPC ............ *G06F 3/0482* (2013.01); *H04L 51/34* (2013.01); *H04L 67/42* (2013.01)

(58) Field of Classification Search
CPC ........... G06Q 10/06; G06Q 10/063116; G06Q 10/103; G06F 3/0482; H04L 51/34; H04L 67/42; H04L 12/1813
See application file for complete search history.

(56) References Cited

U.S. PATENT DOCUMENTS

| | | | |
|---|---|---|---|
| 5,608,898 A | 3/1997 | Turpin | |
| 5,611,076 A | 3/1997 | Durflinger | |
| 5,721,770 A | 2/1998 | Kohler | |
| 6,332,147 B1 | 12/2001 | Moran | |
| 6,769,013 B2 | 7/2004 | Frees | |
| 7,086,062 B1 | 8/2006 | Faour | |
| 7,676,542 B2 | 3/2010 | Moser | |
| 7,779,039 B2 | 8/2010 | Weissman | |
| RE41,848 E | 10/2010 | Daniell | |
| 7,996,744 B2 | 8/2011 | Ojala | |
| 7,996,774 B1 | 8/2011 | Sidenur | |
| 8,522,240 B1 | 8/2013 | Merwarth | |
| 8,527,287 B1 | 9/2013 | Bhatia | |
| 9,208,262 B2 | 12/2015 | Bechtel | |

(Continued)

OTHER PUBLICATIONS

Asana, Asana Demo and Product Tour, Dec. 7, 2017, YouTube, https://www.youtube.com/watch?v=IMAFWVLGFyw.*

(Continued)

*Primary Examiner* — Mohamed Abou El Seoud
(74) *Attorney, Agent, or Firm* — Esplin & Associates, PC (57) ABSTRACT

Systems and methods for generating and tracking hardcoded communications in a collaboration management platform, the method being performed by one or more physical computer processors configured by machine-readable instructions are disclosed. One or more implementations may: manage environment state information maintaining a collaboration environment; receive user input indicating one or more selections of the message buttons corresponding to the preset messages from client computing platforms associated with the one or more users; update, responsive to receiving the first user input indicating selection of the first message button, a first communication parameter for the first unit of work; and effectuate presentation of the first preset message corresponding to the first message button within a graphical user interface associated with the first unit of work.

20 Claims, 4 Drawing Sheets

(56) References Cited

U.S. PATENT DOCUMENTS

| | | |
|---|---|---|
| 9,251,484 B2 | 2/2016 | Cantor |
| 9,600,136 B1 | 3/2017 | Yang |
| 9,674,361 B2 | 6/2017 | Ristock |
| 9,830,398 B2 | 11/2017 | Schneider |
| 9,949,681 B2 | 4/2018 | Badenes |
| 10,264,067 B2 | 4/2019 | Subramani |
| 10,308,992 B2 | 6/2019 | Chauvin |
| 10,455,011 B2 | 10/2019 | Kendall |
| 10,594,788 B2 | 3/2020 | Larabie-Belanger |
| 10,616,151 B1 | 4/2020 | Cameron |
| 10,623,359 B1 | 4/2020 | Rosenstein |
| 10,671,692 B2 * | 6/2020 | Koopman ............ G06F 16/9558 |
| 10,922,104 B2 | 2/2021 | Sabo |
| 2002/0143594 A1 | 10/2002 | Kroeger |
| 2003/0028595 A1 | 2/2003 | Vogt |
| 2003/0097406 A1 * | 5/2003 | Stafford ................... H04L 51/02 709/204 |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |
| 2004/0093290 A1 | 5/2004 | Doss |
| 2004/0098291 A1 | 5/2004 | Newburn |
| 2004/0162833 A1 | 8/2004 | Jones |
| 2004/0207249 A1 | 10/2004 | Baumgartner |
| 2004/0230447 A1 | 11/2004 | Schwerin-Wenzel |
| 2005/0210394 A1 | 9/2005 | Crandall |
| 2005/0222971 A1 | 10/2005 | Cary |
| 2006/0047454 A1 | 3/2006 | Tamaki |
| 2006/0095859 A1 | 5/2006 | Bocking |
| 2006/0143270 A1 | 6/2006 | Wodtke |
| 2006/0190391 A1 | 8/2006 | Cullen, III |
| 2006/0277487 A1 | 12/2006 | Poulsen |
| 2007/0038494 A1 | 2/2007 | Kreitzberg |
| 2007/0143169 A1 | 6/2007 | Grant |
| 2007/0255715 A1 | 11/2007 | Li |
| 2008/0082389 A1 | 4/2008 | Gura |
| 2008/0082956 A1 | 4/2008 | Gura |
| 2008/0091782 A1 | 4/2008 | Jakobson |
| 2008/0155547 A1 | 6/2008 | Weber |
| 2008/0158023 A1 | 7/2008 | Chung |
| 2008/0167937 A1 | 7/2008 | Coughlin |
| 2008/0222566 A1 | 9/2008 | Daughtrey |
| 2008/0244582 A1 | 10/2008 | Brown |
| 2008/0270198 A1 | 10/2008 | Graves |
| 2008/0281665 A1 | 11/2008 | Opaluch |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0088137 A1 | 4/2010 | Weiss |
| 2010/0106627 A1 | 4/2010 | O'Sullivan |
| 2010/0131860 A1 | 5/2010 | Dehaan |
| 2010/0145801 A1 | 6/2010 | Chekuri |
| 2010/0169802 A1 * | 7/2010 | Goldstein ............ G06F 16/958 715/760 |
| 2010/0312605 A1 | 12/2010 | Mitchell |
| 2011/0015961 A1 | 1/2011 | Chan |
| 2011/0060720 A1 | 3/2011 | Devereux |
| 2011/0161128 A1 | 6/2011 | Barney |
| 2012/0035942 A1 | 2/2012 | Graupner |
| 2012/0066030 A1 | 3/2012 | Limpert |
| 2012/0123835 A1 | 5/2012 | Chu |
| 2012/0158946 A1 | 6/2012 | Shafiee |
| 2012/0192086 A1 | 7/2012 | Ghods |
| 2013/0007332 A1 | 1/2013 | Teh |
| 2013/0013560 A1 | 1/2013 | Goldberg |
| 2013/0014023 A1 | 1/2013 | Lee |
| 2013/0066944 A1 | 3/2013 | Laredo |
| 2013/0073328 A1 | 3/2013 | Ehrler |
| 2013/0124638 A1 | 5/2013 | Barreto |
| 2013/0179799 A1 | 7/2013 | Savage |
| 2013/0246399 A1 | 9/2013 | Schneider |
| 2013/0279685 A1 | 10/2013 | Kohler |
| 2014/0012603 A1 | 1/2014 | Scanlon |
| 2014/0040780 A1 | 2/2014 | Artzt |
| 2014/0040905 A1 | 2/2014 | Tadanobu |
| 2014/0059910 A1 | 3/2014 | Norton |
| 2014/0089719 A1 | 3/2014 | Daum |
| 2014/0189017 A1 | 7/2014 | Prakash |
| 2014/0208325 A1 | 7/2014 | Chen |
| 2014/0257894 A1 | 9/2014 | Melahn |
| 2014/0288987 A1 | 9/2014 | Liu |
| 2015/0007058 A1 | 1/2015 | Wooten |
| 2015/0113540 A1 | 4/2015 | Rabinovici |
| 2015/0262111 A1 | 9/2015 | Yu |
| 2015/0363092 A1 | 12/2015 | Morton |
| 2015/0379472 A1 | 12/2015 | Gilmour |
| 2016/0063192 A1 | 3/2016 | Johnson |
| 2016/0063449 A1 | 3/2016 | Duggan |
| 2016/0124775 A1 | 5/2016 | Ashtiani |
| 2016/0180277 A1 | 6/2016 | Skiba |
| 2016/0180298 A1 | 6/2016 | McClement |
| 2016/0188145 A1 | 6/2016 | Vida |
| 2016/0216854 A1 | 7/2016 | McClellan |
| 2016/0224939 A1 | 8/2016 | Chen |
| 2016/0275436 A1 | 9/2016 | Kurjanowicz |
| 2016/0328217 A1 | 11/2016 | Hagerty |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0103369 A1 | 4/2017 | Thompson |
| 2017/0116552 A1 | 4/2017 | Deodhar |
| 2017/0132200 A1 | 5/2017 | Noland |
| 2017/0154024 A1 | 6/2017 | Subramanya |
| 2017/0206217 A1 | 7/2017 | Deshpande |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0344754 A1 | 11/2017 | Kumar |
| 2017/0351385 A1 | 12/2017 | Ertmann |
| 2018/0052943 A1 | 2/2018 | Hui |
| 2018/0059910 A1 | 3/2018 | Wooten |
| 2018/0060818 A1 | 3/2018 | Ishiyama |
| 2018/0102989 A1 | 4/2018 | Borsutsky |
| 2018/0131649 A1 | 5/2018 | Ma |
| 2018/0173386 A1 | 6/2018 | Adika |
| 2018/0225795 A1 | 8/2018 | Napoli |
| 2018/0247352 A1 | 8/2018 | Rogers |
| 2018/0260081 A1 | 9/2018 | Beaudoin |
| 2018/0331842 A1 | 11/2018 | Faulkner |
| 2018/0367477 A1 | 12/2018 | Hariram |
| 2019/0014070 A1 | 1/2019 | Mertvetsov |
| 2019/0340574 A1 | 11/2019 | Ekambaram |
| 2020/0065736 A1 | 2/2020 | Relangi |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0110347 A1 | 4/2021 | Khalil |
| 2021/0232282 A1 | 7/2021 | Karpe |

OTHER PUBLICATIONS

Wix.com, How to Use Wix Code with Marketing Tools to Create Custom Events, Oct. 18, 2018, YouTube, https://www.youtube.com/watch?v=MTBVyk0YGv0&feature=emb_title.*

Creating Tables with Fields from 2 Different Tables, published: 2009, publisher: StackOverflow, pp. 1-2. (Year: 2009).

"Rules of Data Conversion from Document to Relational Databases", published: 2014, publisher: Future-processing, pp. 1-8 (Year: 2014).

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).

Critical chain project management, Wkipedia, archives org, Dec. 17, 2016 https://web.archive.Org/web/20161217090326/https://en.

(56) References Cited

OTHER PUBLICATIONS wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

www.asana.com (as retrieved from https://web.archive.Org/web/20160101054536/https://asana.com/press and https://web.archive.org/web/20160101054527/https://asana.com/product) (Year: 2016) 15 pages.

Asset, F., Cassius, T. S., & Maria, T. S. (2018). Confrontation between techniques of time measurement. Journal of Manufacturing Technology Management, 29(5), 789-810. (Year: 2018).

Hartmann, "TimeProjectscheduling with resource capacities and requests varying with time: a case study," 2013, Flexible services and manufacturing journal, vol. 25, No. 1, pp. 74-93 (Year: 2013).

Paul Minors, How to automate your tasks, youtube excerpts, Oct. 18, 2019 https://www.youtube.com/watch?v=lwF9XyUQrzw (Year: 2019).

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).

(Tiburca, Andrew) Best Team Calendar Applications for 2018-Toggl https://toggl.com/blog/best-team-calendar-applications-for-2018 (Year: 2017).

\* cited by examiner

SYSTEMS AND METHODS FOR GENERATING AND TRACKING HARDCODED COMMUNICATIONS IN A COLLABORATION MANAGEMENT PLATFORM

FIELD OF THE DISCLOSURE

The present disclosure relates to systems and methods for generating and tracking hardcoded communications in a collaboration management platform, the method being performed by one or more physical computer processors configured by machine-readable instructions.

BACKGROUND

Collaboration environments enable users to assign projects, tasks, or other assignments to assignees to complete. Typically, a chat interface enables users to communicate within the collaboration environment. Users may often communication the same or similar messages having the same meaning over and over. This requires the user to repetitively type the message(s) within the chat interface. have due dates by which the users want the assignee to complete them. Typically, the users set due dates for assignments or tasks without having any indication of whether or not the due date is likely to be met by the assignee.

SUMMARY

Message buttons may enable instant communication of preset messages related to units of work within a graphical user interface. The preset messages may have predetermined meanings that are frequently used by users when working on the units of work within the collaboration platform. Instead of the users having to type out the same message, or messages having the same meaning, over and over, the message buttons provide single input feedback without requiring the user to repetitively type the same message. The message buttons facilitate more efficient communication related to units of work and improve the use of graphical user interfaces for managing units of work within the collaboration environment. Such hardcoded communications initiated by selection of the message buttons by the users may be tracked and/or provide a variety of information about the units of work the message buttons are used for and/or the users that use them.

One aspect of the present disclosure relates to a system configured for generating and tracking hardcoded communications in a collaboration management platform. The method may be performed by one or more physical computer processors configured by machine-readable instructions. The system may include one or more hardware processors configured by machine-readable instructions. The processor(s) may be configured to manage environment state information maintaining a collaboration environment. The environment state information may include values of user parameters and values of work unit parameters. The values of the user parameters may be organized in user records corresponding to users interacting with and/or viewing the collaboration environment. The values of the work unit parameters may be organized in work unit records corresponding to units of work managed, created, and/or assigned within the collaboration environment. Managing the environment state information may include updating the values of the work unit parameters responsive to user communications associated with the units of work.

The user communications may include one or more hardcoded communications including preset messages having predetermined meanings such that values of communication parameters for the units of work are updated responsive to one or more users selecting message buttons corresponding to the preset messages. The processor(s) may be configured to receive user input indicating one or more selections of the message buttons corresponding to the preset messages from client computing platforms associated with the one or more users. The user input may include first user input indicating selection of a first message button corresponding to a first preset message. The processor(s) may be configured to update, responsive to receiving the first user input indicating selection of the first message button, a first communication parameter for the first unit of work. The processor(s) may be configured to effectuate presentation of the first preset message corresponding to the first message button within a graphical user interface associated with the first unit of work.

In some implementations, a system configured for generating and tracking hardcoded communications in a collaboration management platform may include one or more of: one or more servers, one or more client computing platforms, and/or other components. The one or more servers may be configured to communicate with one or more client computing platforms according to a client/server architecture and/or other architecture. The one or more servers and/or client computing platforms may include one or more physical processors configured to execute one or more computer program components. The computer program components may include one or more of an environment state component, a user input component, a message button component, a graphical user interface component, a communication information component, a preset message metric component, and/or other components.

The environment state component may be configured to manage environment state information maintaining a collaboration environment. The environment state information may include values of user parameters, values of work unit parameters, and/or values of other parameters. The values of the user parameters may be organized in user records corresponding to users interacting with and/or viewing the collaboration environment. The values of the work unit parameters may be organized in work unit records corresponding to units of work managed, created, and/or assigned within the collaboration environment. Managing the environment state information may include updating the values of the work unit parameters responsive to user communications associated with the units of work. The user communications may include one or more hardcoded communications. The hardcoded communications may include likes, preset messages, and/or other hardcoded communications. The present messages may have predetermined meanings. As such, values of communication parameters for the units of work may be updated responsive to one or more users selecting message buttons corresponding to the preset messages.

In some implementations, the predetermined meaning of one or more preset message(s) may include: that a given user is working on a given unit of work, that a given user needs more time to complete a given unit of work, that a given user needs help to complete a given unit of work, a request for a status update for a given unit of work, a reminder for a given unit of work, and/or other predetermined meanings. In some implementations, the predetermined meanings of the one or more preset messages may be customizable.

The user input component may be configured to receive user input indicating one or more selections of the message buttons corresponding to the preset messages. The user input may be received from client computing platforms associated with the one or more users. The user input may include first user input indicating selection of a first message button corresponding to a first preset message. In some implementations, where the preset messages and/or the predetermined meanings of the one or more preset messages are customizable, the user input component may be configured receive user input indicating a preset message and/or a unit of work associated with the preset message.

The message button component may be configured to generate a message button corresponding to the preset message. The message button may be generated responsive to and/or based on the user input indicating the preset message and/or the unit of work associated with the preset message. The message button may be for and/or associate with a unit of work, a user, a group of users, a group of units of work, a department, and/or other items within and/or associated with the collaboration environment.

The graphical user interface associated with a given unit of work may be configured to display one or more message buttons corresponding to preset messages, one or more like buttons, one or more communications, work information, user information, and/or other content. The graphical user interface component may be configured to effectuate presentation of the first preset message. The first preset message corresponding to the first message button may be presented responsive to the first user selecting the first message button. The first preset message may be presented within a graphical user interface associated with the first unit of work.

In some implementations, the communication information component may be configured to obtain communication information. The communication information component may be configured to monitor the user input indicating the one or more selections of the message buttons corresponding to the one or more preset messages having predetermined meanings from client computing platforms associated with the one or more users to obtain the communication information.

In some implementations, the preset message metric component may be configured to determine one or more preset message metrics. The preset message metrics may characterize the preset messages selected based on the communication information. The present message metrics may include one or more of a quantity of preset messages, a period of time between multiple preset messages, a period of time between selection of a preset message and an interaction with another user and/or unit of work, and/or other preset message metrics.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
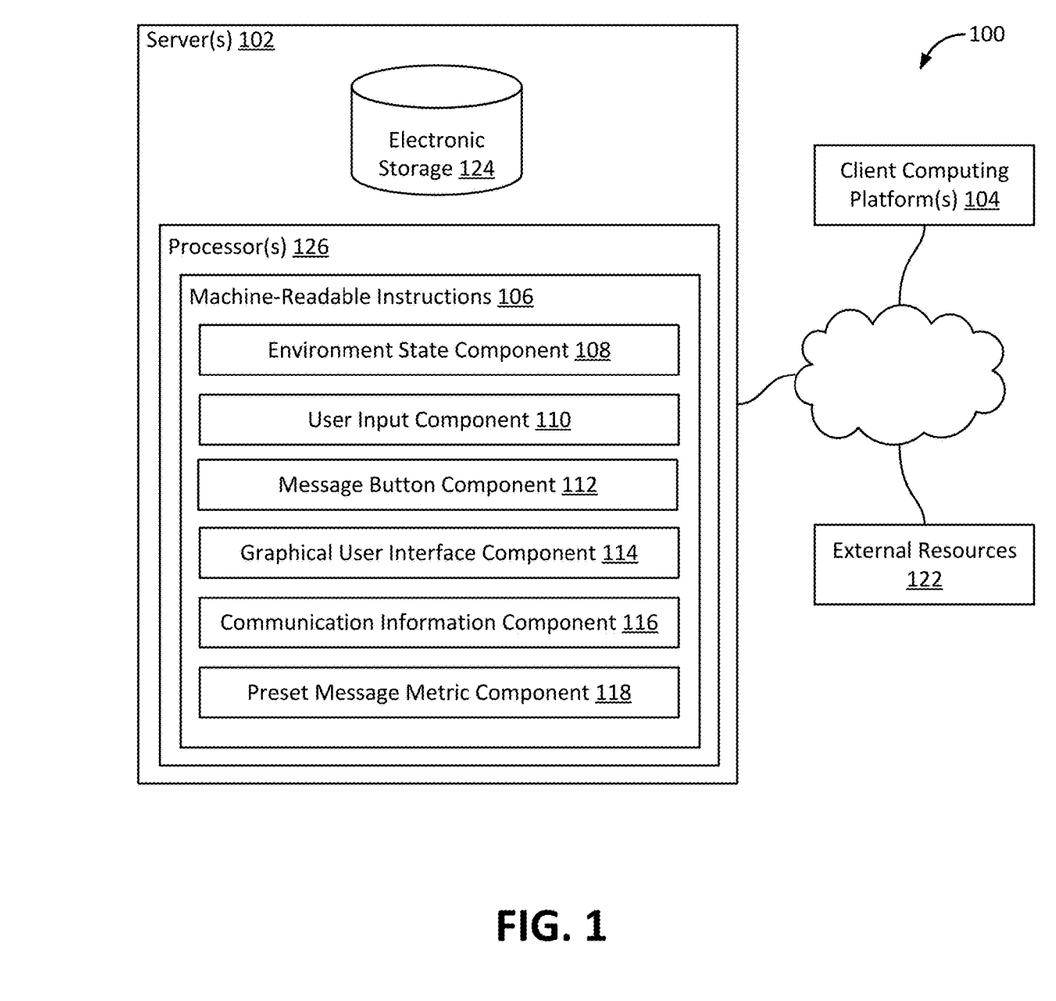
FIG. 1 shows a system configured for generating and tracking hardcoded communications in a collaboration management platform, the method being performed by one or more physical computer processors configured by machine-readable instructions, in accordance with one or more implementations.

FIG. 1 illustrates a system 100 configured for generating and tracking hardcoded communications in a collaboration management platform, the method being performed by one or more physical computer processors configured by machine-readable instructions, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of a collaboration environment managing component 108, a user input component 110, a communication parameter update component 112, a graphical user interface component 114, a communication information component 116, a preset message metric component 118, a message button generating component 120, and/or other instruction components.

Environment state component 108 may be configured to manage environment state information maintaining a collaboration environment. The environment state information may include values of user parameters and values of work unit parameters. By way of non-limiting example, the values of the user parameters may be organized in user records corresponding to users interacting with and viewing the collaboration environment. The values of the work unit parameters may be organized in work unit records corresponding to units of work managed, created, and/or assigned within the collaboration environment. A given work unit may have one or more assignees and/or users working on the given unit of work. Units of work may include one or more to-do items, action items, objectives, and/or other units of work one or more users should accomplish and/or plan on accomplishing. Units of work may be created by a given user for the given user and/or created by the given user and assigned to one or more other users. A given unit of work may include one or more projects, tasks, sub-tasks, assignments, to-do-items, and/or other units of work possibly assigned to and/or associated with one or more users.

The work unit parameters may, by way of non-limiting example, include one or more of: one or more units of work, one or more user communication parameters (e.g., hardcoded communication parameters and/or comment parameters describing the content/messages of the comments and/or communications, a creator, a recipient, one or more followers, one or more other interested parties, content, one or more times, etc.), a unit of work name, a unit of work description, one or more unit of work dates (e.g., a start date, a due date, a completion date, and/or other unit of work dates), one or more users associated with a unit of work (e.g., an owner, one or more other project/task members, member access information, and/or other unit of work members and/or member information), a status parameter (e.g., an update, a hardcoded status update, a completed/uncomplete/mark complete, a measured status, a progress indication, quantity of sub-units of work remaining for a given unit of work, completed units of work in a given project, and/or other status parameter), one or more interaction parameters (e.g., indicating a given unit of work is being worked on/was worked on, given unit of work of work was viewed, a given unit of work was selected, how long the given unit of work has been idle, a last interaction parameter indicating when and what user last interacted with the given unit of work, users that interacted with the given unit of work, and/or otherer interaction parameters indicating sources of the interactions, context of the interactions, content of the interactions and/or time for the interactions), one or more file attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, sub-tasks within a task, etc.,), state of a workspace for a given unit of work (e.g., application state parameters, application status, application interactions, user information, and/or other parameters related to the state of the workspace for a unit of work), dependencies between one or more units of work, one or more custom fields (e.g., priority, cost, stage, and/or other custom fields), other work unit parameters for the given units of work, and/or other work unit parameters, and/or user parameters for one or more users and/or units of work the given project is associated with.

The user parameters associated with the users interacting with and/or viewing the collaboration environment may include parameters describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user interacting with and/or viewing the collaboration environment.

The user parameters may, by way of non-limiting example, include one or more of: a user name, a group parameter, a subset parameter, a user account, a user role, a user department, descriptive user content, a to-email, a from-email, a photo, an organization, a workspace, one or more projects (which may include project parameters defined by one or more work unit records), one or more items of work (which may include one or more unit of work parameters defined by one or more unit of work records), one or more user communication parameters (e.g., hardcoded communication parameters and/or comment parameters describing the content/messages of the comments and/or communications sent, initiated and/or received by a given user, etc.), one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), a presence parameter (e.g., indicating presence and/or interaction level at an environment level, unit of work level, project level, task level, application level, etc.), one or more notification settings, one or more progress parameters, status information for one or more units of work the user is associated with, one or more statistics related to a given user (e.g., how many units of work the user has completed, how quickly the user completed the units of work, how quickly the user completes certain types of units of work, the efficiency of the user, bandwidth of the user, activity level of the user, etc.), application access information (e.g., username/password for one or more third-party applications), one or more favorites and/or priorities, workload information, schedule information, historical information, other user parameters for the given user, and/or other user parameters and/or work unit parameters, for one or more units of work the given user is associated with.

The environment state component 108 may be configured to update the values of the work unit parameters responsive to user communications associated with the units of work. The user communications may include one or more hardcoded communications and/or other communications. The hardcoded communications may include fixed communications related to one or more units of work that users may make, initiate, and/or receive within the collaboration environment. For example, the hardcoded communications may include one or more of preset messages, likes, and/or other hardcoded communications. The preset messages may include set messages (e.g., having set textual content) that have predetermined meanings.

Graphical user interfaces corresponding to one or more units of work may include one or more message buttons corresponding to one or more preset messages. Users may initiate communication, transmission, and/or presentation of a preset message by selecting (e.g., clicking on and/or otherwise initiating selection of) one or more of the message buttons. When a user selects a message button corresponding to the preset message, the preset message may be communicated (e.g., presented) within the graphical user interface (GUI).

Responsive to one or more users selecting message buttons corresponding to one or more preset messages, the values of the communication parameters for the units of work associated with the GUI and/or the message buttons corresponding to the preset messages may be updated. The preset message may be presented within a graphical user interface associated with one or more units of work. Presentation of the preset message may convey a predetermined meaning of the preset message to one or more users viewing the GUI. The predetermined meanings of the preset messages may correspond to the meanings of messages frequently initiated, communicated, and/or transmitted by users within the collaboration environment. The preset messages may be preset in order to prevent the user from having to repetitively type the same message over and over. Instead, the user can just select the corresponding message button causing transmission and/or presentation of the preset message conveying the predetermined meaning.

The predetermined meaning(s) of one or more preset message(s) may include: that a given user is working on a given unit of work, that a given user needs more time to complete a given unit of work, that a given user needs help to complete a given unit of work, a request for a status update for a given unit of work, a reminder for a given unit of work, and/or other predetermined meanings. By way of non-limiting example, a preset message having a predetermined meaning that the given user that selected the preset message is working on the given unit of work may include "I'm working on this!" or "This is in progress." By way of another non-limiting example, a preset message having a predetermined meaning that a given user needs more time to complete a given unit of work may include "I need more time." or "I'm still working on this." In some implementations, the preset messages and/or the predetermined meanings of the one or more preset messages may be customizable. The preset messages may be customizable for a given unit of work, for a given group of users, for a given segment of the collaboration environment, for the collaboration environment as a whole, and/or otherwise customizable.

The message buttons may be separate and distinct from a like button. The graphical user interface may include one or more like buttons the indicate a predetermine meaning (e.g., that the user likes a given comment, unit of work, and/or other aspect of the graphical user interface). The like buttons may include, for example, a thumbs up icon and/or other icon. The like button may not initiate presentation of a preset message and/or preset text (but rather presentation of an icon) that is communicated and/or presented within the graphical user interface.

Environment state component 108 may be configured to update one or more communication parameters responsive to receiving user input selecting one or more of the message buttons corresponding to the one or more preset messages and/or an indication of user input indicating selection of one or more of the message buttons corresponding to the one or more preset messages. In some implementations, the environment state component 108 may be configured to communicate with user input component 110. For example, responsive to receiving the first user input indicating selection of the first message button (e.g., from user input component 110), environment state component 108 may update a first communication parameter for the first unit of work.

User input component 110 may be configured to receive user input indicating one or more selections of the message buttons corresponding to the preset messages from client computing platforms associated with the one or more users. For example, the user input may include first user input indicating selection of a first message button corresponding to a first preset message. A first predetermined meaning of the first preset message may include, for example, that a first user is working on the first unit of work responsive to the first user selecting the first message button, that a first user needs more time to complete the first unit of work responsive to the first user selecting the first message button, that a first user needs help to complete the first unit of work responsive to the first user selecting the first message button, a request for a status update for the first unit of work responsive to a second user selecting the first message button, a reminder for the first unit of work responsive to the first user and/or another user selecting the first message button, and/or another predetermined meaning. User input component 110 may be configured to receive user input indicating a preset message and/or a unit of work associated with the preset message.

In some implementations, message button component 112 may be configured to generate one or more message buttons corresponding to one or more preset messages. Users may initiate generation of a message button corresponding to a preset message via a graphical user interface and/or customize the preset message and/or the predetermined meaning of the preset message corresponding to the message button.

Graphical user interface component 114 may be configured to effectuate presentation of a graphical user interface. The graphical user interface may include work information for one or more units of work, user information for one or more users, one or more communications (e.g., hardcoded communications, comments, and/or other communications), one or more message buttons corresponding to preset messages, one or more like buttons, and/or other information. In some implementations, the graphical user interface component 114 may be configured to effectuate presentation of the message button within a graphical user interface associated with the unit of work. The first preset message corresponding to the first message button may be presented within a graphical user interface associated with the first unit of work responsive to a user selecting the first message button.

Figure 2:
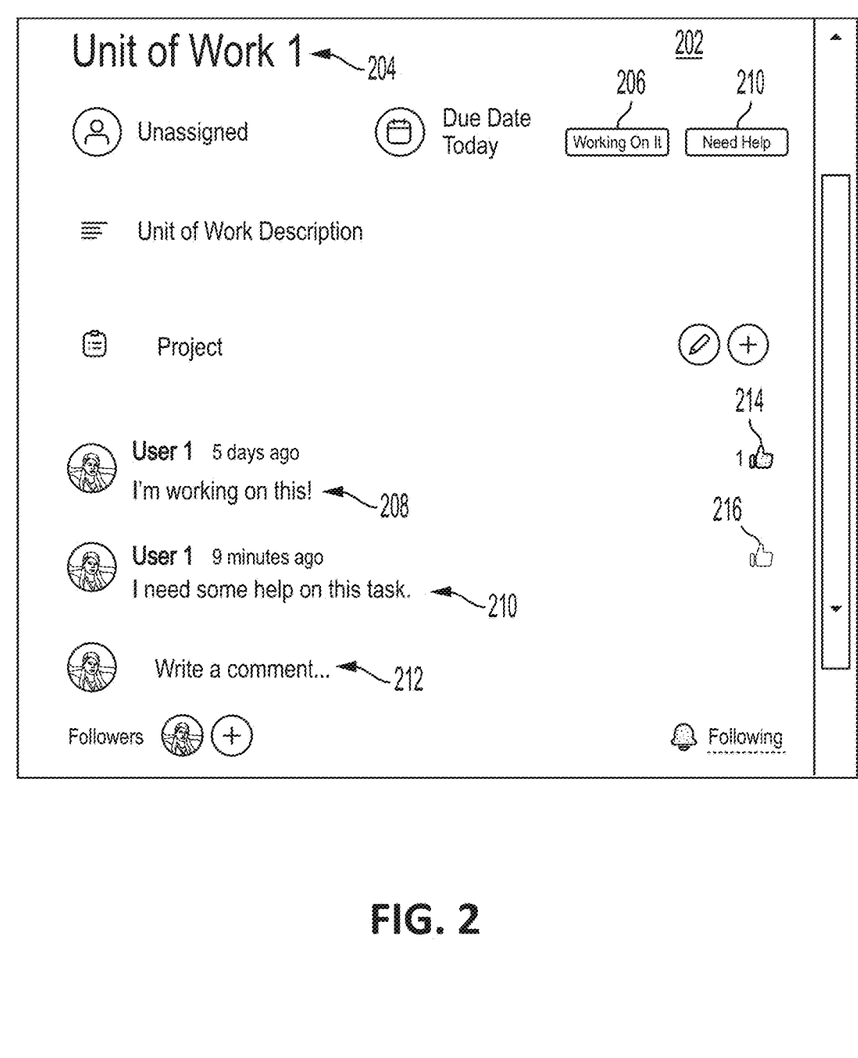
FIG. 2 illustrates an example graphical user interface presenting message buttons and corresponding preset messages, in accordance with one or more implementations.

FIG. 2 illustrates an example graphical user interface presenting message buttons and corresponding preset messages, in accordance with one or more implementations. Graphical user interface 202 may include work information for unit of work 204. Graphical user interface 202 may include one or more message buttons 206 and 210. Message button 206 may correspond to preset message 208. Message button 210 may correspond to preset message 211. Responsive to a user selecting message button 206, preset message 208 may be presented within graphical user interface 202. Responsive to a user selecting message button 210, preset message 211 may be presented within graphical user interface 202. Graphical user interface 202 may include one or more like buttons 216. Responsive to a user selecting a like button 216, a like icon 214 may be presented within graphical user interface 202. Graphical user interface 202 may include comment text box 212 through which users can enter one or more non-hardcoded messages and/or comments.

Figure 3:
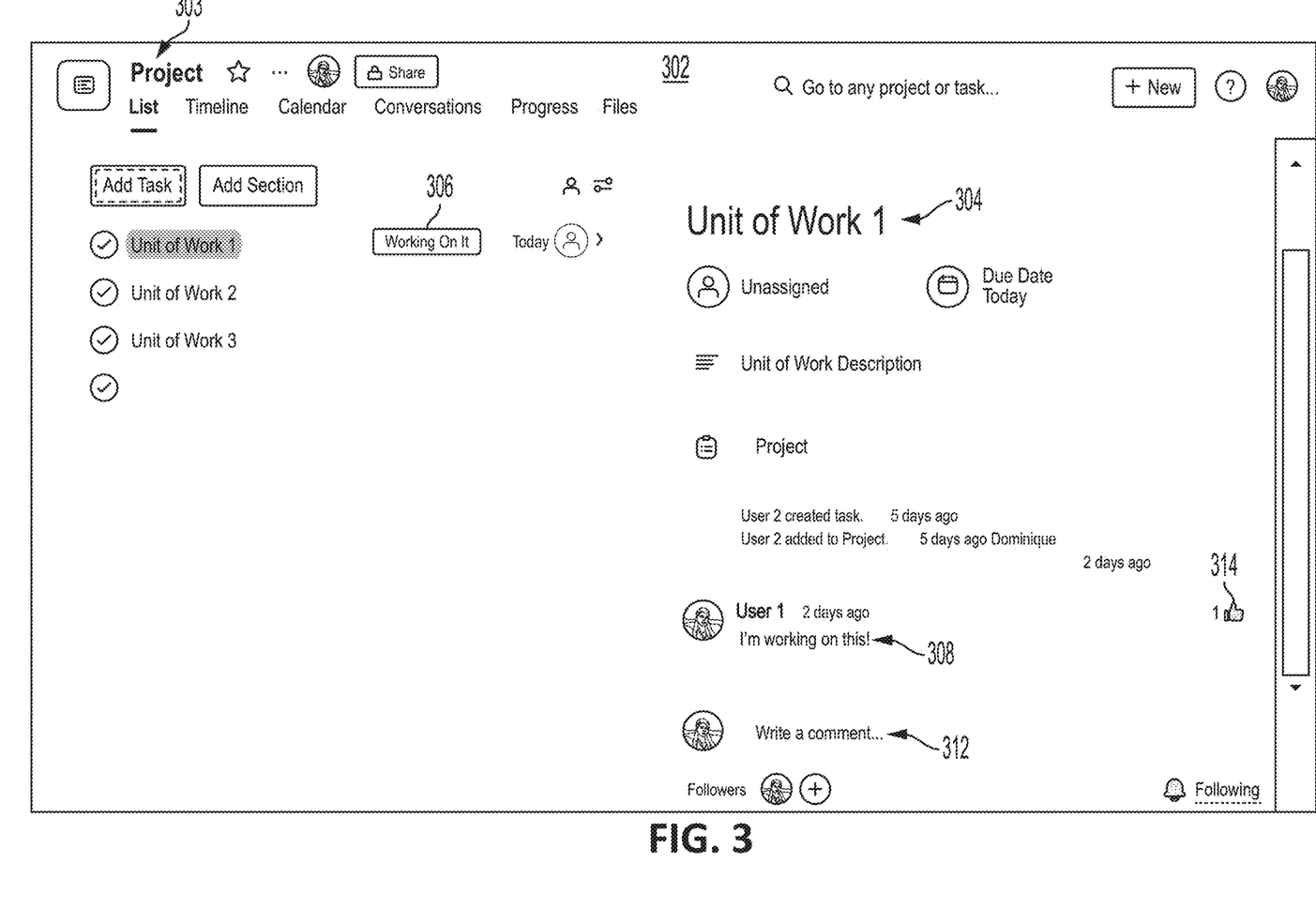
FIG. 3 illustrates an example graphical user interface presenting a message button and corresponding preset message, in accordance with one or more implementations.

FIG. 3 illustrates an example graphical user interface presenting a message button and corresponding preset message, in accordance with one or more implementations. Graphical user interface 302 may include units of work 305 and/or work information 304 for units of work 305. Graphical user interface 302 may include one or more message buttons 306 corresponding to one or more preset messages. Message button 306 may correspond to preset message 308. Responsive to a user selecting message button 306, preset message 308 may be presented within graphical user interface 302. Graphical user interface 302 may include one or more like buttons. Responsive to a user selecting a like button, a like icon 314 may be presented within graphical user interface 302. Graphical user interface 302 may include comment text box 312 through which users can enter one or more non-hardcoded messages and/or comments.

Returning to FIG. 1, communication information component 116 may be configured to obtain communication information. The communication information may characterize the communications made by users within the collaboration environment including the hardcoded communications and/or non-hardcoded communications. Communication information component 116 may be configured to monitor the user input indicating the one or more selections of the message buttons corresponding to the one or more preset messages to obtain communication information characterizing the hardcoded communications.

Preset message metric component 118 may be configured to determine one or more preset message metrics characterizing the preset messages selected and/or initiated by the users within the collaboration environment. Preset message metric component 118 may be configured to determine the preset message metrics based on the communication information. The preset message metrics may be determined for the collaboration environment as a whole, one or more groups of users, one or more units of works, one or more groups of units of work, one or more departments, one or more preset messages, one or more predetermined meanings, one or more message buttons corresponding to one or more preset messages, and/or other for other segments of the collaboration environment, users, and/or units of work.

In some implementations, the preset message metrics may include one or more of a quantity of preset messages, a period of time between multiple preset messages, a period of time between selection of a preset message and an interaction with another user and/or unit of work, and/or other preset message metrics. By way of non-limiting example, a period of time between multiple preset messages may include how many hours, days, and/or months pass between the presentation of two or more preset messages.

In some implementations, server(s) 102, client computing platform(s) 104, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 122 may be operatively linked via some other communication media.

A given client computing platform 104 may include one or more processors configured to execute computer program components. The computer program components may be configured to enable an expert or user associated with the given client computing platform 104 to interface with system 100 and/or external resources 122, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 122 may include sources of information outside of system 100, external entities participating with system 100, and/or other resources. In some implementations, some or all of the functionality attributed herein to external resources 122 may be provided by resources included in system 100.

Server(s) 102 may include electronic storage 124, one or more processors 126, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 124 may comprise non-transitory storage media that electronically stores information. The electronic storage media of electronic storage 124 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from server(s) 102, information received from client computing platform(s) 104, and/or other information that enables server(s) 102 to function as described herein.

Processor(s) 126 may be configured to provide information processing capabilities in server(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. Processor(s) 126 may be configured to execute components 108, 110, 112, 114, 116, and/or 118, and/or other components. Processor(s) 126 may be configured to execute components 108, 110, 112, 114, 116, and/or 118, and/or other components by software; hardware; firmware; some combination of software, hardware, and/or firmware; and/or other mechanisms for configuring processing capabilities on processor(s) 126. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, and/or 118 are illustrated in FIG. 1 as being implemented within a single processing unit, in implementations in which processor(s) 126 includes multiple processing units, one or more of components 108, 110, 112, 114, 116, and/or 118 may be implemented remotely from the other components. The description of the functionality provided by the different components 108, 110, 112, 114, 116, and/or 118 described below is for illustrative purposes, and is not intended to be limiting, as any of components 108, 110, 112, 114, 116, and/or 118 may provide more or less functionality than is described. For example, one or more of components 108, 110, 112, 114, 116, and/or 118 may be eliminated, and some or all of its functionality may be provided by other ones of components 108, 110, 112, 114, 116, and/or 118. As another example, processor(s) 126 may be configured to execute one or more additional components that may perform some or all of the functionality attributed below to one of components 108, 110, 112, 114, 116, and/or 118.

Figure 4:
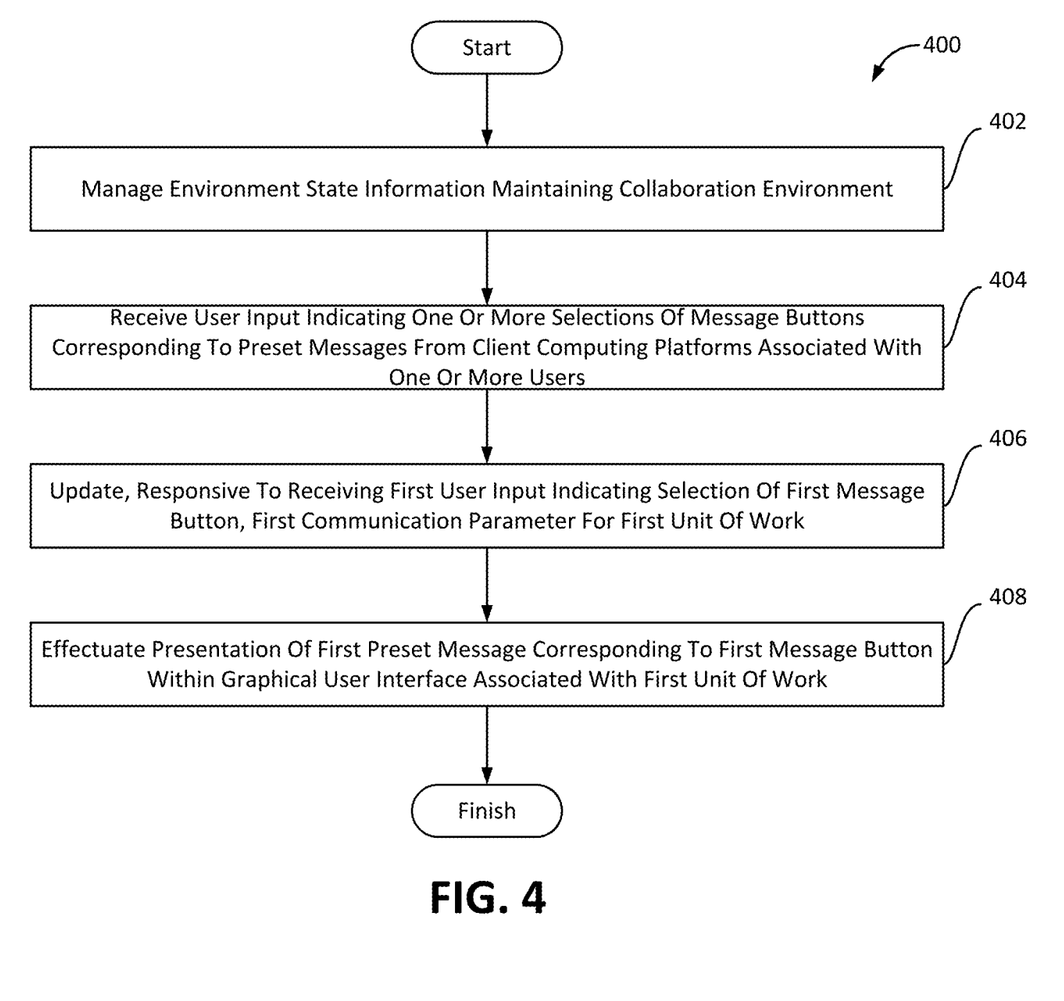
FIG. 4 includes a flow chart of a method for generating and tracking hardcoded communications in a collaboration management platform, the method being performed by one or more physical computer processors configured by machine-readable instructions, in accordance with one or more implementations.

FIG. 4 illustrates a method 400 for generating and tracking hardcoded communications in a collaboration management platform, the method being performed by one or more physical computer processors configured by machine-readable instructions, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include managing environment state information maintaining a collaboration environment. The environment state information may include values of user parameters and values of work unit parameters. The values of the user parameters may be organized in user records corresponding to users interacting with and viewing the collaboration environment and the values of the work unit parameters are organized in work unit records corresponding to units of work managed, created, and/or assigned within the collaboration environment. Managing the environment state information may include updating the values of the work unit parameters responsive to user communications associated with the units of work. The user communications may include one or more hardcoded communications including preset messages having predetermined meanings such that values of communication parameters for the units of work are updated responsive to one or more users selecting message buttons corresponding to the preset messages. Operation 402 may be performed by one or more hardware processors configured by machine-readable instructions including a component that is the same as or similar to environment state component 108, in accordance with one or more implementations.

An operation 404 may include receiving user input indicating one or more selections of the message buttons corresponding to the preset messages from client computing platforms associated with the one or more users. The user input may include first user input indicating selection of a first message button corresponding to a first preset message. Operation 404 may be performed by one or more hardware processors configured by machine-readable instructions including a component that is the same as or similar to user input component 110, in accordance with one or more implementations.

An operation 406 may include updating, responsive to receiving the first user input indicating selection of the first message button, a first communication parameter for the first unit of work. Operation 406 may be performed by one or more hardware processors configured by machine-readable instructions including a component that is the same as or similar to environment state component 108, in accordance with one or more implementations.

An operation 408 may include effectuating presentation of the first preset message corresponding to the first message button within a graphical user interface associated with the first unit of work. Operation 408 may be performed by one or more hardware processors configured by machine-readable instructions including a component that is the same as or similar to graphical user interface component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for generating and tracking hardcoded communications in a collaboration management platform, the system comprising:
one or more hardware processors configured by machine-readable instructions to:
manage environment state information maintaining a collaboration environment, the environment state information including values of user parameters and values of work unit parameters, wherein the values of the user parameters are organized in user records corresponding to users interacting with and viewing the collaboration environment and the values of the work unit parameters are organized in work unit records corresponding to units of work managed, created, and/or assigned within the collaboration environment, wherein managing the environment state information includes updating the values of the work unit parameters responsive to user communications associated with the units of work, wherein the user communications include hardcoded communications including preset messages having predetermined meanings such that values of communication parameters for the units of work are updated responsive to the users selecting message buttons corresponding to the preset messages, wherein the user parameters include a team parameter characterizing one or more teams that the users belong to, such that a first team comprises a first set of users and a second team comprises a second set of users, and wherein the work unit parameters include a collaboration parameter characterizing groups of users working on the units of work;
effectuate presentation of a graphical user interface of the collaboration environment through which the users access the units of work, the graphical user interface including one or more of the message buttons corresponding to the preset messages, such that the first team and the second team access a first unit of work via the graphical user interface;

receive user input indicating selections of the one or more of the message buttons corresponding to the preset messages within the graphical user interface presenting the first unit of work, the user input including a first set of user input indicating selections of a first message button corresponding to a first preset message from the first set of users belonging to the first team, and a second set of user input indicating selections of the first message button corresponding to the first preset message from the second set of users belonging to the second team;

obtain communication information by monitoring the user input into the graphical user interface presenting the first unit of work by the first team and the second team indicating the selections of the one or more of the message buttons corresponding to the preset messages;

determine preset message metrics characterizing use of the preset messages by different teams of users based on the communication information, wherein the preset message metrics include a first preset message metric characterizing use of the first message button corresponding to the first preset message by the first team within the graphical user interface presenting the first unit of work, and a second preset message metric characterizing use of the first message button corresponding to the first preset message by the second team within the graphical user interface presenting the first unit of work.

2. The system of claim 1, wherein the preset message metrics further include:

periods of time between the presentations of different preset messages, such that a third preset message metric includes a first period of time between the presentation of the first preset message and a second preset message;

periods of time between the presentation of a given preset message and an interaction of a given user with an other user, such that a fourth preset message metric includes a second period of time between the presentation of the first preset message and an interaction of a first user with a second user; and periods of time between the presentation of the given preset message and an interaction with an other unit of work, such that a fifth preset message metric includes a third period of time between the presentation of the first preset message and an interaction by the first user with a second unit of work.

3. The system of claim 1, wherein a first predetermined meaning of the first preset message includes work is being performed on the first unit of work.

4. The system of claim 1, wherein a first predetermined meaning of the first preset message includes more time is needed to complete the first unit of work.

5. The system of claim 1, wherein a first predetermined meaning of the first preset message includes help is needed that to complete the first unit of work.

6. The system of claim 1, wherein a first predetermined meaning of the first preset message includes a request for a status update for the first unit of work.

7. The system of claim 1, wherein a first predetermined meaning of the first preset message includes a reminder for the first unit of work.

8. The system of claim 1, wherein the hard coded communications further include likes in addition to the preset messages, and wherein the message buttons are separate and distinct from a like button.

9. The system of claim 1, wherein the predetermined meanings of the preset messages are customizable.

10. The system of claim 1, wherein the one or more hardware processors are further configured by machine-readable instructions to:

receive second user input indicating a second preset message and a second unit of work associated with the second preset message;

generate a second message button corresponding to the second preset message; and effectuate presentation of the second message button within a second graphical user interface associated with second the unit of work.

11. A method for generating and tracking hardcoded communications in a collaboration management platform, the method being performed by one or more physical computer processors configured by machine-readable instructions, the method comprising:

managing environment state information maintaining a collaboration environment, the environment state information including values of user parameters and values of work unit parameters, wherein the values of the user parameters are organized in user records corresponding to users interacting with and viewing the collaboration environment and the values of the work unit parameters are organized in work unit records corresponding to units of work managed, created, and/or assigned within the collaboration environment, wherein managing the environment state information includes updating the values of the work unit parameters responsive to user communications associated with the units of work, wherein the user communications include hardcoded communications including preset messages having predetermined meanings such that values of communication parameters for the units of work are updated responsive to the users selecting message buttons corresponding to the preset messages, wherein the user parameters include a team parameter characterizing one or more teams that the users belong to, such that a first team comprises a first set of users and a second team comprises a second set of users, and wherein the work unit parameters include a collaboration parameter characterizing groups of users working on the units of work;

effectuating presentation of a graphical user interface of the collaboration environment through which the users access the units of work, the graphical user interface including one or more of the message buttons corresponding to the preset messages, such that the first team and the second team access a first unit of work via the graphical user interface;

receiving user input indicating selections of the one or more of the message buttons corresponding to the preset messages within the graphical user interface presenting the first unit of work, the user input including a first set of user input indicating selections of a first message button corresponding to a first preset message from the first set of users belonging to the first team, and a second set of user input indicating selections of the first message button corresponding to the first preset message from the second set of users belonging to the second team;

obtaining communication information by monitoring the user input into the graphical user interface presenting the first unit of work by the first team and the second team indicating the selections of the one or more of the message buttons corresponding to the preset messages;

determining preset message metrics characterizing use of the preset messages by different teams of users based on the communication information, wherein the preset message metrics include a first preset message metric characterizing use of the first message button corresponding to the first preset message by the first team within the graphical user interface presenting the first unit of work, and a second preset message metric characterizing use of the first message button corresponding to the first preset message by the second team within the graphical user interface presenting the first unit of work.

12. The method of claim 11, wherein the preset message metrics further include:
periods of time between the presentations of different preset messages, such that a third preset message metric includes a first period of time between the presentation of the first preset message and a second preset message;
periods of time between the presentation of a given preset message and an interaction of a given user with an other user, such that a fourth preset message metric includes a second period of time between the presentation of the first preset message and an interaction of a first user with a second user; and
periods of time between the presentation of the given preset message and an interaction with an other unit of work, such that a fifth preset message metric includes a third period of time between the presentation of the first preset message and an interaction by the first user with a second unit of work.

13. The method of claim 11, wherein a first predetermined meaning of the first preset message includes work is being performed on the first unit of work.

14. The method of claim 11, wherein a first predetermined meaning of the first preset message includes more time is needed to complete the first unit of work.

15. The method of claim 11, wherein a first predetermined meaning of the first preset message includes help is needed to complete the first unit of work.

16. The method of claim 11, wherein a first predetermined meaning of the first preset message includes a request for a status update for the first unit of work.

17. The method of claim 11, wherein a first predetermined meaning of the first preset message includes a reminder for the first unit of work.

18. The method of claim 11, wherein the hard coded communications further include likes in addition to the preset messages, and wherein the message buttons are separate and distinct from a like button.

19. The method of claim 11, wherein the predetermined meanings of the preset messages are customizable.

20. The method of claim 11, further comprising:
receiving second user input indicating a second preset message and a second unit of work associated with the second preset message;
generating a second message button corresponding to the second preset message;
effectuating presentation of the second message button within a second graphical user interface associated with the second unit of work.

* * * * *

UNITED STATES PATENT AND TRADEMARK OFFICE
CERTIFICATE OF CORRECTION

Page 1 of 1

PATENT NO. : 11,204,683 B1
APPLICATION NO. : 16/243489
DATED : December 21, 2021
INVENTOR(S) : Gregory Louis Sabo It is certified that error appears in the above-identified patent and that said Letters Patent is hereby corrected as shown below:

In the Claims

Claim 5, Column 13, Line 57 delete "that" therefor.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*